US012220999B2

(12) United States Patent
Straßer

(10) Patent No.: US 12,220,999 B2
(45) Date of Patent: Feb. 11, 2025

(54) CONDUCTIVE CHARGING UNIT FOR A MOTOR VEHICLE AND METHOD FOR CONTROLLING A CONDUCTIVE CHARGING UNIT

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 233 days.

(21) Appl. No.: 18/173,958

(22) Filed: Feb. 24, 2023

(65) Prior Publication Data

US 2023/0278439 A1    Sep. 7, 2023

(30) Foreign Application Priority Data

Mar. 7, 2022   (DE) .......................... 102022105236.2

(51) Int. Cl.
| | |
|---|---|
| B60L 5/42 | (2006.01) |
| B60L 53/16 | (2019.01) |
| H01R 13/00 | (2006.01) |
| H01R 13/447 | (2006.01) |
| H02J 7/00 | (2006.01) |
| B60L 53/14 | (2019.01) |

(52) U.S. Cl.
CPC ............ *B60L 53/16* (2019.02); *H01R 13/005* (2013.01); *H01R 13/447* (2013.01); *H02J 7/0042* (2013.01); *H01R 2201/26* (2013.01)

(58) Field of Classification Search
CPC .... B60L 5/42; B60L 5/36; B60L 53/14; B60L 11/18; F04D 25/08; F04D 25/0673
See application file for complete search history.

(56) References Cited

U.S. PATENT DOCUMENTS

| | | | |
|---|---|---|---|
| 2018/0034294 A1* | 2/2018 | Tseng ..................... | H02J 7/0044 |
| 2020/0101856 A1* | 4/2020 | Klausner ................. | B60L 50/50 |
| 2021/0122256 A1* | 4/2021 | Jernej ..................... | B60L 53/60 |

FOREIGN PATENT DOCUMENTS

| | | |
|---|---|---|
| CN | 104953644 A | 9/2015 |
| CN | 107719154 A | 2/2018 |
| DE | 102015006308 A1 | 11/2016 |
| DE | 202017106747 U1 | 3/2018 |

(Continued)

OTHER PUBLICATIONS

Search Report issued on May 5, 2023, in corresponding German Application No. 102022105236.2, 8 pages.

*Primary Examiner* — Tan Q Nguyen
(74) *Attorney, Agent, or Firm* — Maier & Maier, PLLC

(57) ABSTRACT

A conductive charging unit for a motor vehicle for electrically charging an energy storage device of the motor vehicle, including a charging contact unit with a charging contact which, for electrically conductive coupling to a charging connection of a charging plate external to the motor vehicle, is moved from a retracted position into an extended position in an extension direction and has a protective cover surrounding the charging contact unit perpendicular to the extension direction, which protective cover is extended together with the charging contact. The protective cover has a first end and a second end opposite in the extension direction with an edge region. The edge region has a circumferential hollow chamber, which includes at least one opening which provides a fluidic connection between the environment of the charging unit.

20 Claims, 2 Drawing Sheets

(56) References Cited

FOREIGN PATENT DOCUMENTS

| | | |
|---|---|---|
| DE | 102016121355 A1 | 5/2018 |
| DE | 102017115909 A1 | 1/2019 |
| DE | 102018112472 A1 | 4/2019 |
| DE | 102019004383 A1 | 1/2020 |
| DE | 102018123350 A1 | 3/2020 |
| DE | 102021111035 A1 | 11/2022 |

* cited by examiner

CONDUCTIVE CHARGING UNIT FOR A MOTOR VEHICLE AND METHOD FOR CONTROLLING A CONDUCTIVE CHARGING UNIT

FIELD

The invention relates to a conductive charging unit for a motor vehicle for electrically charging an energy storage device in the motor vehicle, wherein the conductive charging unit has a charging contact unit with a charging contact which can be extended from a retracted position to an extended position in an extension direction for electrically conductive coupling to a charging connection of a charging plate external to the motor vehicle. In addition, the conductive charging unit comprises a protective cover surrounding the charging contact unit perpendicular to the extension direction, which protective cover can be extended together with the charging contact, wherein the protective cover has a first end and a second end opposite in the extension direction with an edge region. Furthermore, the invention also relates to a method for operating a conductive charging unit.

BACKGROUND

DE 20 2017 106 747 U1 describes a vehicle connection device as part of a vehicle battery charging system for automatic, conductive connection to a ground contact unit on the power source side, wherein the vehicle connection device has a vehicle contact unit with an electrode-carrying base and a contacting actuator, which has a base section which can be fixed on the vehicle, a reset drive for the base, and at least one tension element. The reset drive can change the length of the tension element and thus control a movement of the base relative to the base section. The contacting actuator may also have a source of compressed air and a shell having an interior space, wherein the shell extends from the base section to the base, and wherein the source of compressed air may apply compressed air to the interior space to lower the vehicle contact unit. An air outlet can also be provided in the base. In addition, the base can have a sealing lip which is provided on the outer circumference of the base.

Conductive charging systems for connection from below represent a cheaper and more efficient alternative to wireless charging systems, such as inductive charging systems. In order to reliably establish contact between an on-board charging contact unit and the contact point on the ground, the contact points should be free of contaminants and liquid, such as water, if possible. A fan motor has been used to date to safely displace water or moisture. The aim of the airflow generated in this way is to keep any water or moisture that may be present away from the contact point on the ground. However, such an airflow alone cannot produce a tight connection between the contact from the side of the vehicle and the base plate. There is therefore a risk of water entering the contact area during the charging process, for example. When water gets in again due to weather conditions, the fan has to be reactivated again and again, which costs energy, reduces the efficiency of the charging process, and can be heard acoustically. The design with a sealing lip does not solve this problem optimally either.

SUMMARY

The object of the present invention is therefore to provide a conductive charging unit and a method that make it possible, in the most efficient way possible, to keep a contact area between the charging contact of the charging unit and the charging connection of the charging plate external to the vehicle free of liquids or contaminants in the simplest possible way, even while charging.

In this case, a conductive charging unit according to the invention for a motor vehicle for electrically charging an energy storage device in the motor vehicle has a charging contact unit with a charging contact which can be extended from a retracted position to an extended position in an extension direction for electrically conductive coupling to a charging connection of a charging plate external to the motor vehicle. Furthermore, the conductive charging unit comprises a protective cover surrounding the charging contact unit perpendicular to the extension direction, which protective cover can be extended together with the charging contact, wherein the protective cover has a first end and a second end opposite in the extension direction with an edge region. In this case, the protective cover has a circumferential hollow chamber in the edge region, which hollow chamber comprises at least one opening which provides a fluidic connection between the hollow chamber and an environment of the charging unit, wherein the conductive charging unit comprises a vacuum unit which is designed to suction air out of the hollow chamber.

The invention is based on several findings at the same time: On the one hand, it is advantageously possible to use a vacuum unit to enable the protective cover to be suctioned onto the support surface, which in the present case is provided by a charging plate. Such a suction function can advantageously achieve a seal from the outside or from the environment, which makes it difficult for liquid or contaminants to penetrate. However, if the vacuum were to be generated in an entire interior area surrounded by the protective cover, a very large volume would have to be sealed off, which is relatively expensive. By providing an edge region with a circumferential hollow chamber and at least one opening provided therein, it is now advantageously possible, on the other hand, to also provide a suction function on the support surface, namely the base plate, but in a much simpler and more efficient way, since the air is only suctioned from the hollow chamber for this purpose and not from the entire interior area surrounded by the protective cover. Thus, advantageously, a vacuum can only be generated at the lower edge of the suction nozzle or the protective cover, so that it rests firmly on the base plate and can therefore be sealed against moisture and dirt even more easily. At the same time, the interior area with the contact area located therein can be protected much more efficiently against the ingress of contaminants and, above all, water during the charging process. An optional fan of the charging unit does not therefore have to be permanently active and also has to be activated much less often or not at all during the charging process, which is especially energy-saving. Above all, however, this significantly reduces the high noise level caused by the fan during charging if it no longer has to be activated or activated less often. As a result, a lot of energy can be saved during the charging process and the efficiency of the charging process can also be increased. This is especially advantageous in combination with the conductive design of the charging unit, as it represents a significantly cheaper and more efficient alternative to wireless charging systems.

The conductive charging unit and the vehicle-external charging plate can provide a charging system which should also be regarded as part of the invention. Such a conductive charging unit is preferably provided for attachment to the underside of a motor vehicle, in particular in an underbody area, and the charging plate is then preferably designed as a base plate that can be positioned or is positioned on a support surface or is integrated into it. The base plate can provide a flat surface. The contact between the charging unit and the charging plate is made, for example, by a charging contact of the charging unit being extended in an extension direction for coupling to the charging connection of the charging plate, in particular in the direction of the charging plate, until ultimately the electrical contact between the charging contact and the charging connection is physically established. In the following, for reasons of simplification, the charging plate is sometimes simply referred to as the base plate without restricting generality. Nevertheless, an arrangement on a wall would also be conceivable and the charging contact extended horizontally, for example.

The charging contact can also comprise several contact elements. The charging connection of the base plate can also have a number of contact elements which can be electrically connected to the corresponding contact elements of the charging contact. In this case, the charging connection of the charging plate can preferably have more charging contacts than are required to establish the charging connection with the charging contact of the charging unit. This facilitates the correct positioning of the charging contact unit relative to the charging plate. Thus, the charging contact unit only needs to be roughly positioned above the charging plate. The charging contact can then simply be extended down to the charging plate and the electrical contact can be closed with those contact elements of the charging connection of the charging plate which are in close proximity. The area in which contact is made between the vehicle-side charging contact and the charging connection of the charging plate is referred to as the contact area.

The charging contact of the charging contact unit can be designed, for example, as a contact plate, for example as a round contact plate, which comprises contact elements that protrude on the underside, that is to say in the extension direction. The protective cover can, for example, be designed as a bellows and, for example, surround the charging contact unit perpendicular to the extension direction in the manner of a hose. As described, the protective cover can have an upper end with respect to the extension direction, which faces the motor vehicle when the conductive charging unit is arranged on a motor vehicle as intended. The conductive charging unit can have a housing, for example, which is intended to be arranged on the underside of the motor vehicle and on which the first end of the protective cover is arranged. The second end with the edge region can be arranged circumferentially around the charging contact, in particular around the round contact plate described. The second end of the protective cover comes into contact with the base plate when the charging contact is in the extended state, in particular in such a way that the at least one opening provided in the edge region is closed by the base plate, so that a vacuum can be generated in the hollow chamber by suctioning air out of it, by means of which vacuum the edge region of the protective cover adheres to the base plate. Furthermore, an interior space or an interior area may be enclosed between the cover, the charging contact, and the above housing. A fluidic connection can also be provided between this interior space and the environment, for example through openings in the charging contact, in particular the round charging contact plate. These openings can function as air outlets in order to blow contaminants off the base plate before contact with the base plate is established when the fan is activated and will be explained in more detail later. The protective cover is also preferably formed from a flexible material so that it can be easily retracted and extended together with the charging contact and can be folded and unfolded like an accordion. The protective cover and the charging contact unit can also be attached to each other. In particular, for example, the charging contact can be attached to the edge region of the protective cover. In order to extend the protective cover together with the charging contact in the extension direction, no separate actuator has to be provided for the protective cover. So if the charging contact is moved in the extension direction, the protective cover attached thereto is also extended accordingly. The charging contact unit is also designed to automatically couple the charging contact with the charging connection on the base plate. The conductive connection to the base plate is therefore established automatically and not manually.

The hollow chamber is preferably designed in such a way that it is also completely circumferentially perpendicular to the extension direction. The edge region can, for example, be designed similar to a peripheral hose, in which the at least one opening is arranged. A direction of longitudinal extension of such a hose corresponds to the circumferential direction of the edge region.

In a further very advantageous embodiment of the invention, the at least one opening is arranged in such a way that, in the extended position of the charging contact, the opening faces away from the first end of the protective cover, wherein, in a contact state in which the charging contact makes contact with the charging connection of the charging plate in a contact area, the at least one opening is closed by the charging plate and a vacuum can be generated at least temporarily in the hollow chamber by means of the vacuum unit in order to seal the contact area from the environment of the charging unit, wherein the vacuum is less than an ambient pressure in the environment. The edge region is thus suctioned firmly onto the base plate via the at least one opening. This makes it possible to provide significantly better sealing of the interior space within the protective cover than would be possible, for example, simply with a sealing lip. The vacuum unit is designed in such a way that it only generates the vacuum when the charging unit is already in the contact state, i.e. the charging contact is already in contact with the charging connection, and in particular when the contact has been checked, according to which it has been determined that the contact is correct or has been established properly for the charging process to be carried out.

In a further advantageous embodiment of the invention, when the conductive charging unit is in the contact state, an interior space of the conductive charging unit surrounded by the protective cover in the radial direction is provided, which interior space encloses the contact area and is delimited in the extension direction by the charging plate external to the motor vehicle, wherein the interior space is spatially separate from the hollow chamber. This therefore has the great advantage that the reduction in the pressure in the hollow chamber when the air is suctioned out by the vacuum unit does not affect the pressure in the interior space. The same pressure can therefore continue to prevail in the interior space as the air pressure in the environment outside the conductive charging unit.

In a further advantageous embodiment of the invention, the charging unit has a vacuum hose, via which the vacuum unit is fluidically connected to the hollow chamber, in particular wherein the vacuum unit and/or the vacuum hose has a shut-off valve which is set up in such a way that it releases air to flow in a specific flow direction from the hollow chamber in the direction of the vacuum unit and blocks it opposite the specific flow direction. Such a vacuum hose can, for example, extend inside the protective cover or also outside the protective cover from the vacuum unit to the edge region, in particular into the hollow chamber. An arrangement within the protective cover has the advantage that the vacuum hose is also protected by the protective cover. The vacuum hose is also preferably designed to be flexible, so that it can be extended and retracted in the extension direction just like the charging contact. The vacuum unit, which is preferably arranged in the region of the first end of the protective cover, that is to say on the vehicle side, can therefore suction the air out of the hollow chamber via this vacuum hose. The shut-off valve also makes it possible, in an especially advantageous manner, to maintain the vacuum generated by suctioning the air when the charging unit is in the contact state. A backflow of air via the vacuum hose into the hollow chamber is thus prevented by this shut-off valve. This shut-off valve can be designed as a passive valve, i.e. not actively controllable, which is dependent on the flow direction. However, it would also be conceivable, albeit less preferred, for the valve to be configured as an actively controllable valve, which releases the flow through the vacuum hose when the vacuum unit is active for the purpose of generating the vacuum in the hollow chamber, and blocks the flow through the vacuum hose after the desired vacuum has been generated.

In a further very advantageous embodiment of the invention, the edge region has several openings distributed in a circumferential direction. By providing several openings arranged in a distributed manner, the sealing with respect to the support surface, in particular the base plate, can take place much more simply and reliably. In this way, in particular, a seal that is equally good on all sides can be provided around the charging contact. It is also advantageous if the individual openings have a relatively small diameter, in particular less than one centimeter and, for example, are in the single-digit millimeter range. The distances between each two adjacently arranged openings can be, for example, only a few centimeters, for example only one centimeter or less. By providing openings that are as small as possible, i.e. with a diameter of between one and five millimeters for example, such openings can be closed much more reliably by the base plate when the charging unit is in contact state. It is therefore significantly more efficient to provide several small openings at small distances from one another in the circumferential direction than a few larger openings at a large distance from one another.

Furthermore, it is very advantageous, as is provided according to a further embodiment of the invention, if the edge region is formed at least partially from an elastic material, for example an elastic plastic. As a result, the edge region can adapt especially flexibly to small uneven areas in the base plate or compensate for them. As a result, an especially good seal to the base plate can be provided.

For example, the edge region can have a contact edge that is designed such that, when the conductive charging unit is in the contact state with the charging plate, it seals the interior space and in particular also seals the hollow chamber, wherein the at least one opening is arranged in the contact edge. At least this contact edge is made of an elastic material. The contact edge can thus also act as a sealing lip at the same time.

Furthermore, the edge region, in particular the chamber wall enclosing the hollow chamber, can be designed in such a way that the internal volume of the hollow chamber is not equal to zero when the vacuum has already been generated as intended. In other words, it is preferred that the edge region is not suctioned completely flat when the vacuum is generated. Due to the fact that the hollow chamber still retains a certain residual volume when the specific vacuum in the hollow chamber is reached, this can provide a certain tolerance compensation and adjustment to uneven ground and height fluctuations of the motor vehicle even better.

According to a further advantageous embodiment of the invention, the charging unit has a fan unit which, in a blower mode, is designed to at least temporarily provide a first airflow within the protective cover in the extension direction, in particular when the charging contact is extended and/or temporarily during charging.

A fan unit, for example a fan motor, can be used to safely displace water or moisture. The first airflow generated in this way can keep water or moisture away from the contact point on the ground, i.e. on the charging plate. It is preferred that the fan unit and the vacuum unit are not active at the same time. Such a fan unit can therefore advantageously initially provide a cleaning function for cleaning the base plate, for example in preparation for a charging process. The fan can blow away leaves or other contaminants, as well as melt and/or dry any water or ice that might be on the base plate. Especially in combination with the generation of the vacuum described above, the fan unit has the great advantage that it no longer has to be activated during the charging process, or much less frequently, in order to ensure that no water penetrates into the contact area during the charging process. Especially in bad weather, for example rain or in winter when there is melt water, there is often a great risk with conventional systems that water will penetrate into this contact area during the charging process, which would make it necessary to activate the fan again. Advantageously, this can now be dispensed with, since the sealing function, which is made possible by the generation of vacuum, means that water can be kept away from the contact area much more efficiently, even during the charging process, without having to activate the fan. But other contaminants, such as dust or small particles, can also be kept away from the interior space much more efficiently with the contact area located there.

The fan unit can, for example, have a fan, for example in the form of a blower, which can be rotated by a fan motor and by means of which the first airflow can be generated inside the protective cover. This first airflow can leave the charging unit on the underside, i.e. in the extension direction, for example through an opening in the charging contact of the charging unit itself, or in openings on the underside in the connecting section of the protective cover.

According to a further advantageous embodiment of the invention, the fan unit represents the vacuum unit and is designed, in a vacuum mode, to operate a fan of the fan unit in order to suction the air out of the hollow chamber, and in particular to generate the vacuum, in such a way that a second airflow can be generated opposite the extension direction, in particular within the vacuum hose described above. The fan which is used to provide an airflow to clean the base plate can thus advantageously also be used to generate the vacuum, for example by simply operating it in the opposite direction and by switching an air duct to the vacuum hose, for example. Correspondingly, the second airflow, which opposes the first airflow, is not generated inside the protective cover, at least not in the entire interior space of the protective cover, but rather in the vacuum hose described above, which is fluidically connected to the hollow chamber. The design of the vacuum unit is especially efficient because existing components can be used or components such as the fan unit can take on a dual function.

In order to provide a sufficiently good sealing function, it is generally not necessary to generate an especially large vacuum. For example, a vacuum that is reduced by 0.1 bar to 0.2 bar compared to the ambient pressure, for example, is sufficient. Thus, the charging unit does not necessarily have to comprise additional components to generate the vacuum, but can simply use the existing fan unit in a further operating mode.

Nevertheless, it is also conceivable that the fan unit is different from the vacuum unit. Thus, if necessary, an additional vacuum pump can also be used as part of the charging unit to generate the vacuum. This is then preferably also arranged on the vehicle side if the conductive charging unit is used as intended on a motor vehicle. The blower mode can thus also be the only mode in which the fan unit can be operated in the activated state.

In a further advantageous embodiment of the invention, the conductive charging unit is set up in such a way that the vacuum unit for suctioning air out of the hollow chamber for a charging process is activated only once beforehand or at the start of the charging process, or several times at time intervals, in particular fixed or definable time intervals, during the charging process, and/or depending on a control parameter.

If the hollow chamber and thus also the interior within the protective cover can be sealed very well, for example, it is possible for the vacuum unit to be activated only once beforehand or at the start of the charging process to generate the vacuum and then, for example after a predetermined activation time or when a predetermined level of vacuum is reached, be deactivated while the vacuum is maintained, in particular sufficiently to enable the interior space to be sealed until the end of the charging process. However, it can also be provided that the vacuum unit is activated several times during the charging process. The activation period can also be predefined, in particular predefined in a fixed manner, or also varied depending on the situation, such as the times of activation and the time intervals between the activations. In the simplest case, provision can be made, for example, for the vacuum unit to be activated several times for a specified activation period at specified, for example equal, time intervals during the charging process. A decrease in the vacuum during the charging process can thus advantageously be counteracted in a simple manner. However, it is also possible for the vacuum unit to be activated several times in a manner appropriate to the situation, which advantageously makes it possible to avoid unnecessary activation of the vacuum unit. Accordingly, it is therefore very advantageous if the vacuum unit is activated, for example, as a function of the control parameter mentioned above. An activation period of the vacuum unit can also be controlled as a function of this control parameter. By providing at least one such control parameter, a significantly better adaptation to the situation can be achieved and, in particular, an unnecessary activation of the vacuum unit can be avoided. This enables the vacuum to be generated as required.

The conductive charging unit can also have a control device that is designed to control the vacuum unit, in particular to control the activation and deactivation of the vacuum unit and/or the fan unit, and in particular also to control other components.

A further very advantageous embodiment of the invention is provided when the charging unit has a pressure sensor for detecting a current pressure in the hollow chamber, wherein the control parameter represents the currently detected pressure. Such a pressure sensor can therefore advantageously be used to measure whether and/or to what extent the vacuum in the hollow chamber changes. If the vacuum decreases excessively, i.e. if it adapts too much to the ambient pressure again, which can be detected by the pressure sensor, the vacuum unit can be reactivated until the desired, definable vacuum value is reached again, which in turn can be detected by the pressure sensor. A pressure sensor can therefore be used to monitor the pressure conditions. This pressure sensor then measures the pressure drop and can then repeatedly request a vacuum from the vacuum unit in the event of a deviation or leakage.

According to a further advantageous embodiment of the invention, the control parameter represents an operating state of the fan unit, wherein the charging unit is designed to activate the vacuum unit depending on the operating state of the fan unit in such a way that the vacuum unit is activated each time the blower mode of the fan unit is deactivated. For example, there may be some reason that water or other contaminants in the contact area gets into the hollow chamber despite the interior space being sealed by means of the vacuum, for example if the vacuum has already dropped too much. For example, the ingress of water into the contact area can be detected through the base plate. The base plate can also communicate this to the motor vehicle system, i.e. to the conductive charging unit, so that it then activates the fan unit in blower mode, for example to remove or dry the water or the contaminants that have penetrated. Following this, the vacuum unit can advantageously be reactivated automatically in order to generate a vacuum again in the hollow chamber for sealing purposes. So every time the fan unit is active in blower mode, the vacuum unit can be activated immediately afterwards in order to generate a vacuum again. Activating the vacuum unit can also, as already described above, mean operating the fan unit in the vacuum mode, and additionally or alternatively activating a separate vacuum pump.

According to a further advantageous embodiment of the invention, the control parameter relates to an environmental condition and/or local weather conditions, in particular wherein the charging unit has a communication unit for wireless communication with the charging plate and for receiving the control parameter.

The wireless communication between the charging plate (14), in particular the base plate, and the charging unit can take place, for example, via WLAN, Bluetooth, or other NFC (Near-Field Communication) communication options. As described, the charging plate (14) can detect, for example, when water gets into the contact area. Such environmental and ambient conditions, in particular also water on other areas of the base plate, can then be communicated to the charging unit as the environmental conditions representing the control parameter. This charging unit can then activate the vacuum unit more often, for example, so that an even better seal against the water can be provided on other areas of the base plate.

In poor weather conditions, such as rain or snow or cold outside temperatures, the probability of water or melt water penetrating into the contact area is increased. As a result, the charging unit can also use this information as a control parameter, for example to activate the vacuum unit more often to enable a much more robust seal. In dry weather and warm outside temperatures, for example, less frequent activation of the vacuum unit is possible. Other environmental conditions can be taken into account, such as the location of the conductive charging unit and the structural environment of this location, for example whether the motor vehicle on which the conductive charging unit is used is currently in a garage or other weather-protected area or on open land. However, such information can not only be provided by the charging plate, but also, for example, by the motor vehicle itself. The motor vehicle can have appropriate information sources and/or sensors, for example rain sensors, GPS sensors, and so on. Accordingly, the charging unit can also have a communication unit for wireless or wired communication with the motor vehicle for receiving the control parameter. The communication unit can also be designed for wireless communication with the charging plate but not necessarily used to receive the control parameter. The conductive charging unit can also be equipped with a control device having intelligence, i.e. with a learning method implemented by an algorithm, so that it can adapt to the typical charging conditions of the relevant motor vehicle on which the conductive charging unit is used. If, for example, it is very rare for liquid or contaminants to be detected in the contact area, the frequency of activation of the vacuum unit can be reduced even if the vacuum decreases or the vacuum adapts to the ambient pressure. On the other hand, if liquid is detected very frequently in the contact area, the vacuum unit can be activated more frequently in order to improve the seal.

Of course, these described control options and various control parameters can also be combined with one another in any desired manner. Thus, for example, several control parameters, for example a first control parameter, a second control parameter, a third control parameter, and so on, can also be provided which relate to the variables described above. The vacuum unit can then, for example, be controlled as a function of all of these control parameters, for example also with a corresponding weighting or prioritization. The control not only relates to the frequency of activation of the vacuum unit but can additionally or alternatively also relate to the activation period.

Furthermore, a motor vehicle having a conductive charging unit according to the invention or one of its embodiments should also be regarded as part of the invention. The motor vehicle is preferably an electric vehicle and has the energy storage device to be charged by means of the charging unit, which energy storage device can be designed as a high-voltage battery, for example.

The motor vehicle according to the invention is preferably configured as an automobile, in particular as a passenger car or truck, or as a passenger bus or motorcycle.

A charging system with a conductive charging unit according to the invention or one of the embodiments thereof should also be regarded as part of the invention. The charging plate can be designed as described above.

Furthermore, the invention also relates to a method for controlling a conductive charging unit of a motor vehicle for electrically charging an energy storage device of the motor vehicle, wherein the conductive charging unit has a charging contact unit with a charging contact which, for electrically conductive coupling to a charging connection of a plate external to the motor vehicle, is moved from a retracted position into an extended position in an extension direction and has a protective cover surrounding the charging contact unit perpendicular to the extension direction, which protective cover is extended together with the charging contact, wherein the protective cover has a first end and a second end opposite in the extension direction with an edge region. In this case, the protective cover has a circumferential hollow chamber in the edge region, which hollow chamber comprises at least one opening which provides a fluidic connection between the hollow chamber and an environment of the charging unit, wherein the conductive charging unit comprises a vacuum unit which suctions air out of the hollow chamber.

The advantages described for the conductive charging unit according to the invention and the embodiments thereof apply in the same way to the method according to the invention.

The vacuum unit suctions the air out of the hollow chamber when the charging unit is preferably already in the contact state.

The invention also includes the control device for the conductive charging unit. The control device can have a data processing device or a processor device which is set up to implement an embodiment of the method according to the invention. For this purpose, the processor device can have at least one microprocessor and/or at least one microcontroller and/or at least one FPGA (Field-Programmable Gate Array) and/or at least one DSP (Digital Signal Processor). Furthermore, the processor device can have program code which is set up to implement the embodiment of the method according to the invention when executed by the processor device. The program code can be stored in a data memory of the processor device.

The invention also includes refinements of the method according to the invention, which have features as have already been described in conjunction with the refinements of the charging unit according to the invention. For this reason, the corresponding refinements of the method according to the invention are not described again here.

The invention also comprises combinations of the features of the described embodiments. The invention also comprises implementations which each have a combination of the features of several of the described embodiments unless the embodiments were described as being mutually exclusive.

BRIEF DESCRIPTION OF THE FIGURES

Exemplary embodiments of the invention are described hereinafter. In the figures.

DETAILED DESCRIPTION

Figure 1:
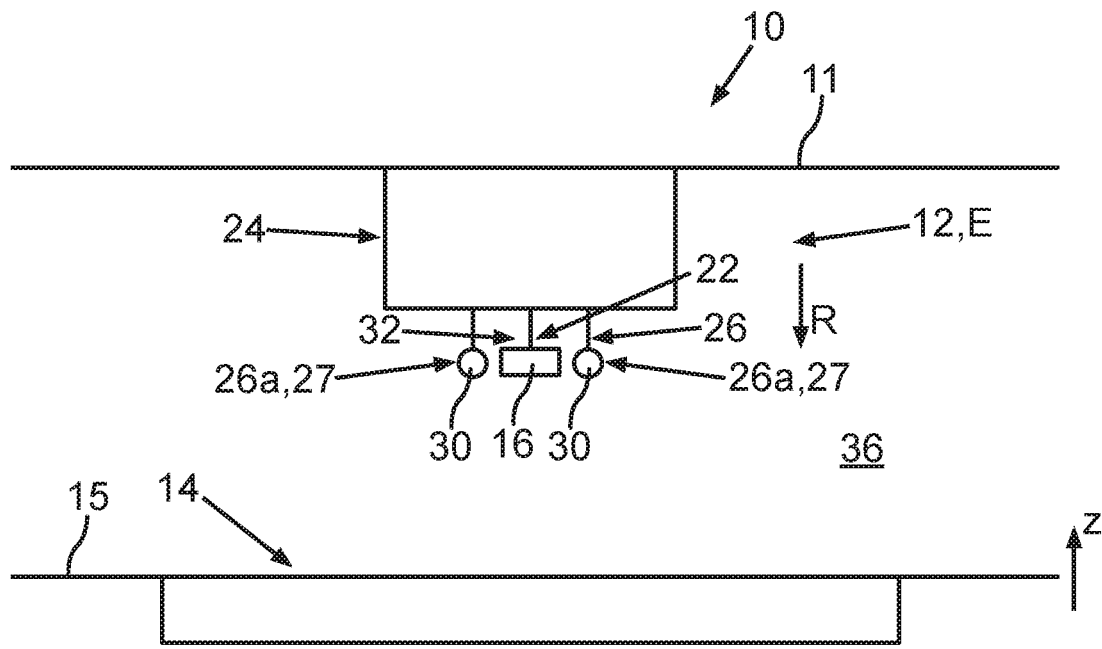
FIG. 1 shows a schematic representation of a conductive charging unit in the retracted state according to an exemplary embodiment of the invention.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further features of the invention as already described.

In the figures, same reference numerals respectively designate elements that have the same function.

Figure 2:
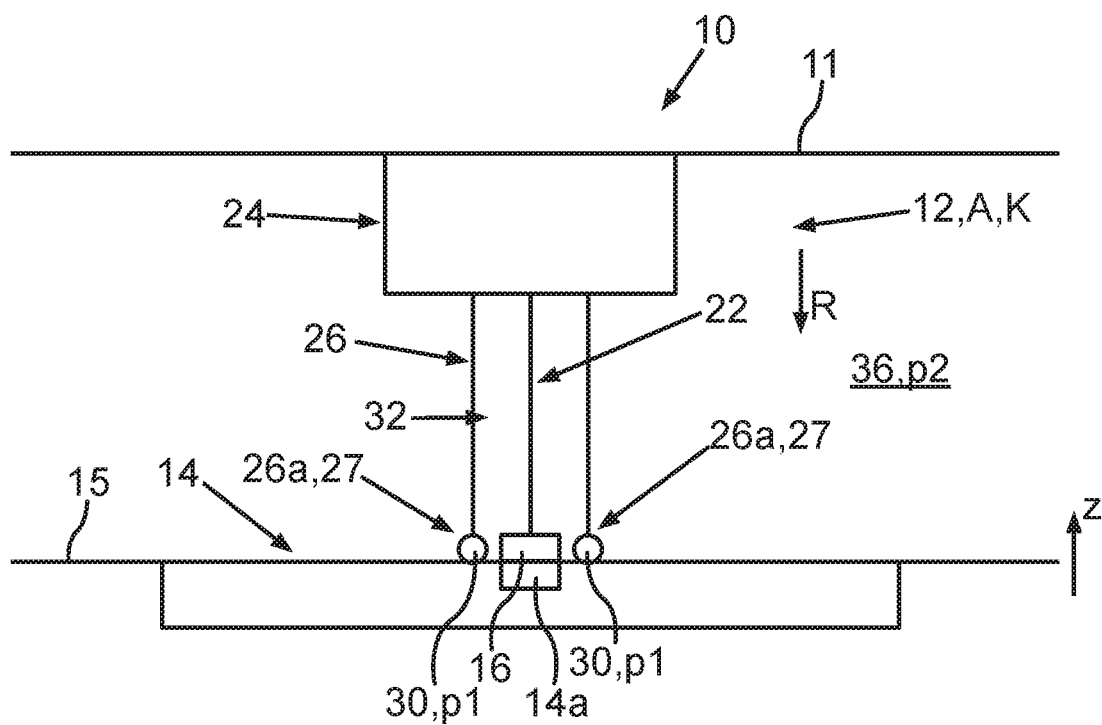
FIG. 2 shows a schematic representation of a conductive charging unit in the contact state, in which the charging unit has contact with a base plate, according to an exemplary embodiment of the invention.

FIG. 1 shows a schematic representation of a motor vehicle 10, of which, for reasons of clarity, only an underbody 11 is shown here, on which a conductive charging unit 12 according to an exemplary embodiment of the invention is arranged. In the situation shown in FIG. 1, the conductive charging unit 12 is in a retracted state E, in which it does not have contact with a charging plate designed as a base plate 14 which is external to the motor vehicle, but instead is spaced apart in the z-direction shown here. The base plate 14 is located on a support surface 15 or can be integrated flush into this support surface 15. In addition, the side of the base plate 14 facing away from the support surface 15 is flat or at least essentially flat. The charging unit 12 in this case has a charging contact designed as a charging contact plate 16, which charging contact is also denoted by 16. The charging contact plate 16 is designed to be movable in an extension direction R, which points in the direction opposite the z-direction shown. The charging contact plate 16 can therefore be moved in the extension direction R from the retracted position E shown in FIG. 1 into an extended position A, which is shown in FIG. 2. In particular, FIG. 2 shows the charging unit 12 from FIG. 1 in the extended position A and also in a contact state K, in which the charging unit 12 is electrically conductively coupled to the base plate 14. For this purpose, the base plate 14 can likewise have a charging connection 14a which can be coupled to the charging contact 16.

The charging contact plate 16 is furthermore part of a charging contact unit 22 comprising the charging unit 12, which can also comprise, for example, the actuators for moving and traversing the charging contact plate 16, as well as any electrical lines or the like. These lines lead from the charging contact plate 16 to a vehicle-side connection of the charging unit 12, which connection can be arranged, for example, in the area of a housing wall of a housing 24 of the charging unit 12. This housing 24 can be attached to the motor vehicle 10. Further components of the charging unit 12 can be arranged in the housing 24, as will be explained in more detail later. A protective cover 26 in the form of a tubular bellows 26 is also arranged on this housing 24. This bellows 26 surrounds the charging contact unit 22 perpendicular to the extension direction R. In this case, an underside end 26a of this protective cover 26 or of the bellows 26 can be attached to the charging contact plate 16, for example on a peripheral edge of the charging contact plate 16. In addition, this underside end 26a of the protective cover 26 can provide an edge region 27 of the protective cover 26, as will be described later in more detail.

Figure 3:
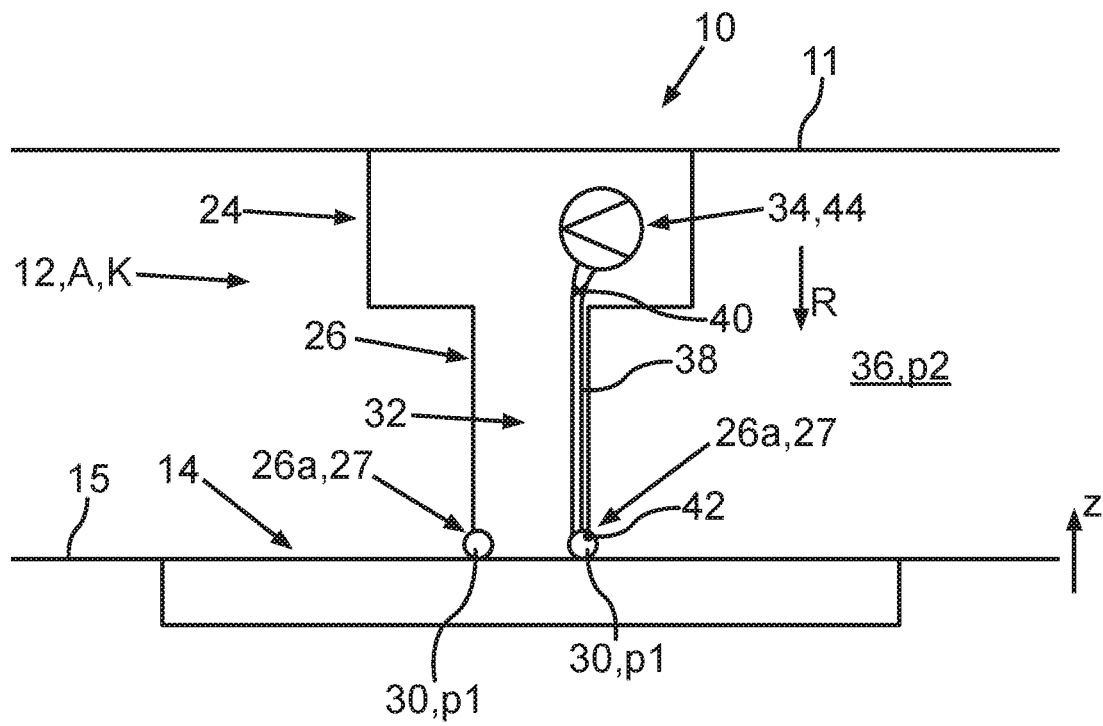
FIG. 3 shows a schematic representation of a conductive charging unit with a vacuum unit, which is connected via a vacuum hose to the hollow chamber, which is arranged in the edge region of the protective cover, according to a further exemplary embodiment of the invention.
Figure 4:
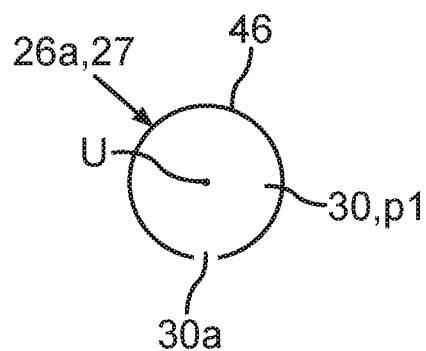
FIG. 4 shows a schematic cross-sectional view of the edge region of the protective cover for a conductive charging unit according to an exemplary embodiment of the invention.

If the charging contact plate 16 is electrically conductively connected to the base plate 14, as shown in FIG. 2, then a contact area 28 is defined between the charging contact plate 16 and the base plate 14. In order to protect this contact area 28 from the ingress of water or contaminants, particularly during a charging process for charging a battery of the motor vehicle 10, in particular a high-voltage battery, it is then advantageously provided that the edge region 27 is formed with a peripheral hollow chamber 30, which also has at least one underside opening 30a (cf. FIGS. 4 and 5), preferably in the form of several holes 30a distributed circumferentially along the edge region 27. The hollow chamber 30 can then advantageously be subjected to a vacuum p1, which is reduced compared to an ambient pressure p2 in the environment 36, in particular outside of the bellows 26. This vacuum p1 can be provided by a vacuum unit 34 (cf. FIG. 3), as will be explained in more detail below. By generating a vacuum p1 in this hollow chamber 30, the edge region 27 can be suctioned onto the base plate 14 via the openings 30a. As a result, the interior space 32 can advantageously be sealed during the charging process and the ingress of water or contaminants can be prevented even more reliably.

FIG. 3 again shows a schematic representation of the conductive charging unit 12 from FIG. 1 and FIG. 2, particularly in the contact state K and in the extended state A, wherein the charging contact unit 22 with the charging contact plate 16 is not shown in this case for reasons of clarity. Instead, the vacuum unit 34 is illustrated here, which can be designed as a vacuum pump, for example. This vacuum pump 34 is then fluidically connected to the hollow chamber 30 in the edge region 27 of the protective cover 26 via a vacuum hose 38. Furthermore, a shut-off valve 40 is provided, which can be arranged, for example, in the vacuum hose 38 or can be provided by part of the vacuum unit 34 or in an intermediate area between the vacuum unit 34 and the vacuum hose 38. This shut-off valve 40 is designed in such a way that suctioning of air from the hollow chamber 30 in the direction of the vacuum unit 34 is possible, but an airflow in the opposite direction is blocked. As a result, once a vacuum p1 has been generated in the hollow chamber 30, it can be durably maintained, in particular for at least a few minutes or even hours. Furthermore, a pressure sensor 42 is also shown in this example, which can be arranged, for example, in the area of the hollow chamber 30 or again in the vacuum hose 38 or a component of the vacuum unit 34. However, it is preferably arranged on the side of the shut-off valve 40 on the hollow chamber side. This pressure sensor 42 can be used to monitor the pressure conditions. For example, this pressure sensor measures the pressure drop and can then repeatedly request a vacuum from the vacuum unit 34 in the event of a deviation or leakage. The vacuum p1 can also be provided by reversing an airflow which is generated by a fan 44. In other words, this fan 44 can provide the vacuum unit 34 in the case of inverse operation. However, the vacuum p1 can also be generated by an additional, separate vacuum pump 34, which is also located on the vehicle side, for example as shown here in the housing 24 described above, which is arranged on the underside or the underbody 11 of the motor vehicle 10.

As an alternative to the pressure sensor 42, an indirect system can also be used. Whenever new moisture is detected after a charging process has started, the water is displaced again by overpressure, i.e. by activating the fan 44, and then sealed again by vacuum, i.e. by activating the vacuum unit 34.

Figure 5:
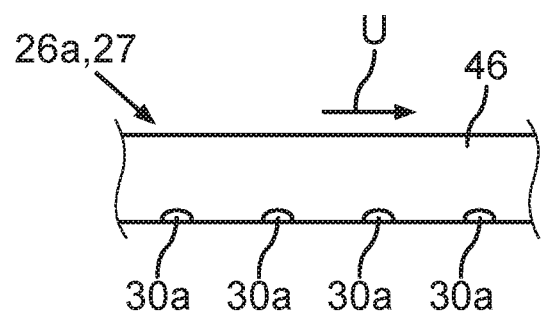
FIG. 5 shows a schematic side view of part of the edge region for a conductive charging unit according to an exemplary embodiment of the invention.

FIG. 4 again shows a schematic cross-sectional representation of a cross-section through the edge region 27 of the protective cover 26 perpendicular to the direction of rotation U, and FIG. 5 shows a schematic representation of part of the edge region 27 in a side view parallel to the direction of rotation U. The edge region 27 can be provided in the manner of a hose 46, which also represents a wall for the hollow chamber 30 at the same time. Several holes 30a spaced apart from one another are arranged in the circumferential direction U in this hose 46. For example, the holes 30a may have a diameter in the millimeter range and a spacing in the centimeter range. However, the distance between two holes 30a can also be less than one centimeter in the circumferential direction. When the conductive charging unit 12 is used as intended, these holes 30a face the support surface, in particular the base plate 14. As a result, by generating the vacuum p1 in the hollow chamber 30, this edge region 27 can be suctioned firmly onto the base plate 14.

For example, after an OK contacting process, in which any water that may have been present has already been displaced by overpressure, a vacuum p1 can then only be generated in the lower edge 27 of the suction nozzle, i.e. the protective cover 26, so that it is firmly on the base plate 14 and can therefore be sealed against moisture and dirt even more easily.

Overall, the examples show how the invention can provide an ACD-U (Automated Charging Device Underbody) suction function on a base plate in automated conductive charging systems. The charging unit described makes it possible to provide increased robustness against the ingress of water or foreign bodies with a lower energy requirement.

The invention claimed is:

1. A conductive charging unit for a motor vehicle for electrically charging an energy storage device in the motor vehicle, comprising:
    a charging contact unit with a charging contact, which can be extended from a retracted position into an extended position in an extension direction for electrically conductive coupling to a charging connection of a charging plate external to the motor vehicle; and
    a protective cover surrounding the charging contact unit perpendicular to the extension direction, which protective cover can be extended together with the charging contact, wherein the protective cover has a first end and a second end opposite in the extension direction with an edge region;
    wherein the protective cover has a circumferential hollow chamber in the edge region, which hollow chamber comprises at least one opening which provides a fluidic connection between the hollow chamber and an environment of the charging unit, wherein the conductive charging unit comprises a vacuum unit which is designed to suction air out of the hollow chamber.

2. The conductive charging unit according to claim 1, the at least one opening is arranged in such a way that, in the extended position of the charging contact, the opening faces away from the first end of the protective cover, wherein, in a contact state in which the charging contact makes contact with the charging connection of the charging plate in a contact area, the at least one opening is closed by the charging plate and a vacuum can be generated at least temporarily in the hollow chamber by the vacuum unit in order to seal the contact area from the environment of the charging unit, wherein the vacuum is less than an ambient pressure in the environment.

3. The conductive charging unit according to claim 2, wherein when the conductive charging unit is in the contact state, an interior space of the conductive charging unit surrounded by the protective cover in the radial direction is provided, which interior space encloses the contact area and is delimited in the extension direction by the charging plate external to the motor vehicle, wherein the interior space is spatially separate from the hollow chamber.

4. The conductive charging unit according to claim 2, wherein the charging unit comprises a vacuum hose, via which the vacuum unit is fluidically connected to the hollow chamber, in particular wherein the vacuum unit and/or the vacuum hose has a shut-off valve which is set up in such a way that it releases air to flow in a specific flow direction from the hollow chamber in the direction of the vacuum unit and blocks it against the specific flow direction.

5. The conductive charging unit according to claim 2, wherein the edge region has several openings distributed in a circumferential direction.

6. The conductive charging unit according to claim 2, wherein the edge region is formed at least in part from an elastic material.

7. The conductive charging unit according to claim 1, wherein when the conductive charging unit is in the contact state, an interior space of the conductive charging unit surrounded by the protective cover in the radial direction is provided, which interior space encloses the contact area and is delimited in the extension direction by the charging plate external to the motor vehicle, wherein the interior space is spatially separate from the hollow chamber.

8. The conductive charging unit according to claim 7, wherein the charging unit comprises a vacuum hose, via which the vacuum unit is fluidically connected to the hollow chamber, in particular wherein the vacuum unit and/or the vacuum hose has a shut-off valve which is set up in such a way that it releases air to flow in a specific flow direction from the hollow chamber in the direction of the vacuum unit and blocks it against the specific flow direction.

9. The conductive charging unit according to claim 7, wherein the edge region has several openings distributed in a circumferential direction.

10. The conductive charging unit according to claim 7, wherein the edge region is formed at least in part from an elastic material.

11. The conductive charging unit according to claim 1, wherein the charging unit comprises a vacuum hose, via which the vacuum unit is fluidically connected to the hollow chamber, in particular wherein the vacuum unit and/or the vacuum hose has a shut-off valve which is set up in such a way that it releases air to flow in a specific flow direction from the hollow chamber in the direction of the vacuum unit and blocks it against the specific flow direction.

12. The conductive charging unit according to claim 11, wherein the edge region has several openings distributed in a circumferential direction.

13. The conductive charging unit according to claim 11, wherein the edge region is formed at least in part from an elastic material.

14. The conductive charging unit according to claim 1, wherein the edge region has several openings distributed in a circumferential direction.

15. The conductive charging unit according to claim 1, wherein the edge region is formed at least in part from an elastic material.

16. The conductive charging unit according to claim 1, wherein the charging unit has a fan unit which, in a blower mode, is designed to at least temporarily provide a first airflow within the protective cover in the extension direction, in particular when the charging contact is extended and/or temporarily during charging,
    wherein the fan unit represents the vacuum unit and is designed, in a vacuum mode, to operate a fan of the fan unit in order to suction the air out of the hollow chamber, and in particular to generate the vacuum, in such a way that a second airflow can be generated opposite the extension direction by this fan; or
    the fan unit is different from the vacuum unit.

17. The conductive charging unit according to claim 1, wherein the conductive charging unit is set up in such a way that the vacuum unit is activated to suction air out of the hollow chamber for a charging process:
  only once beforehand or at the beginning of the charging process; or
  several times at time intervals, in particular fixed or definable time intervals, during the charging process; and/or
  as a function of a control parameter.

18. The conductive charging unit according to claim 17, wherein the charging unit has a pressure sensor for detecting a current pressure in the hollow chamber, wherein the control parameter represents the currently detected pressure; and/or
  the control parameter represents an operating state of the fan unit, wherein the charging unit is designed to activate the vacuum unit depending on the operating state of the fan unit in such a way that the vacuum unit is activated each time the blower mode of the fan unit is deactivated; and/or
  the control parameter relates to an environmental condition and/or local weather conditions, in particular wherein the charging unit has a communication unit for wireless communication with the charging plate and for receiving the control parameter.

19. The conductive charging unit according to claim 1, wherein the edge region is formed at least in part from an elastic material.

20. A method for controlling a conductive charging unit of a motor vehicle for electrically charging an energy storage device of the motor vehicle, wherein the conductive charging unit has a charging contact unit with a charging contact, which is extended from a retracted position into an extended position in an extension direction for electrically conductive coupling to a charging connection of a charging plate external to the motor vehicle; and has a protective cover surrounding the charging contact unit perpendicular to the extension direction, which protective cover can be extended together with the charging contact, wherein the protective cover has a first end and a second end opposite in the extension direction with an edge region;
  wherein the protective cover has a circumferential hollow chamber in the edge region, which hollow chamber comprises at least one opening which provides a fluidic connection between the hollow chamber and an environment of the charging unit, wherein the conductive charging unit comprises a vacuum unit which suctions air out of the hollow chamber.

* * * * *